(12) United States Patent
Xu et al.

(10) Patent No.: US 12,119,447 B2
(45) Date of Patent: Oct. 15, 2024

(54) ELECTROLYTE AND ELECTROCHEMICAL APPARATUS

(71) Applicant: Ningde Amperex Technology Limited, Fujian (CN)

(72) Inventors: Yanyan Xu, Fujian (CN); Chunrui Xu, Fujian (CN); Jianming Zheng, Fujian (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 620 days.

(21) Appl. No.: 17/362,739

(22) Filed: Jun. 29, 2021

(65) Prior Publication Data

US 2021/0351438 A1    Nov. 11, 2021

Related U.S. Application Data (63) Continuation of application No. PCT/CN2020/089041, filed on May 7, 2020.

(51) Int. Cl.
*H01M 10/0567*    (2010.01)
*H01M 4/131*    (2010.01)
(Continued)

(52) U.S. Cl.
CPC ....... *H01M 10/0567* (2013.01); *H01M 4/131* (2013.01); *H01M 4/364* (2013.01);
(Continued)

(58) Field of Classification Search
CPC .. H01M 10/0567; H01M 4/131; H01M 4/364; H01M 4/505; H01M 4/525; H01M 2004/021; H01M 10/0525
(Continued)

(56) References Cited

U.S. PATENT DOCUMENTS

2007/0117024 A1    5/2007    Nakai et al.
2016/0226101 A1*   8/2016    Teran ............... H01M 10/0569
(Continued)

FOREIGN PATENT DOCUMENTS

CN    101826637 A    9/2010
CN    104347847     2/2015
(Continued)

OTHER PUBLICATIONS

Xu, Yanyan; First Office Action for Chinese Patent Application No. 202010379231.3, filed May 7, 2020, mailed Dec. 11, 2020, 8 pages.
(Continued)

*Primary Examiner* — James M Erwin
*Assistant Examiner* — John S Medley
(74) *Attorney, Agent, or Firm* — Maier & Maier, PLLC (57) ABSTRACT

An electrochemical apparatus including a positive electrode, a negative electrode, an electrolyte, and a separator. The positive electrode includes a positive electrode current collector and a positive active material layer disposed on the positive current collector. An X-ray photoelectron spectroscopy of the positive active material layer has a peak at 164 eV to 175 eV. The electrolyte has a retention capability of 1.0 g/Ah to 4.0 g/Ah. The electrolyte improves cycle performance, over-discharge storage performance, and safety performance of the electrochemical apparatus.

18 Claims, 2 Drawing Sheets

(51) Int. Cl.
*H01M 4/36* (2006.01)
*H01M 4/505* (2010.01)
*H01M 4/525* (2010.01)
*H01M 10/0525* (2010.01)
*H01M 4/02* (2006.01)

(52) U.S. Cl.
CPC ........... *H01M 4/505* (2013.01); *H01M 4/525* (2013.01); *H01M 10/0525* (2013.01); *H01M 2004/021* (2013.01); *H01M 2004/028* (2013.01); *H01M 2300/0025* (2013.01)

(58) Field of Classification Search
USPC ......................................................... 429/200
See application file for complete search history.

(56) References Cited

U.S. PATENT DOCUMENTS

| 2017/0324117 | A1* | 11/2017 | Morisawa | H01M 4/13 |
| 2017/0373348 | A1* | 12/2017 | Abe | H01M 10/0567 |
| 2020/0212424 | A1* | 7/2020 | Morita | H01M 4/485 |
| 2020/0251780 | A1* | 8/2020 | Park | C07F 9/65742 |
| 2022/0173402 | A1* | 6/2022 | Jang | H01G 11/28 |

FOREIGN PATENT DOCUMENTS

| CN | 105009348 | | 10/2015 | |
| CN | 106058316 | A | 10/2016 | |
| CN | 106848404 | A | 6/2017 | |
| CN | 107004911 | | 8/2017 | |
| CN | 107046131 | | 8/2017 | |
| CN | 107768719 | | 3/2018 | |
| CN | 108767310 | A | 11/2018 | |
| CN | 111095650 | | 5/2020 | |
| EP | 2966720 | A1 | 1/2016 | |
| WO | WO-2019049937 | A1 * | 3/2019 | ........ H01M 10/052 |
| WO | 2019171434 | A1 | 9/2019 | |

OTHER PUBLICATIONS

Xu, Yanyan; Second Office Action for Chinese Patent Application No. 202010379231.3, filed May 7, 2020, mailed Feb. 4, 2021, 10 pages.

Xu, Yanyan; Third Office Action for Chinese Patent Application No. 202010379231.3, filed May 7, 2020, mailed Mar. 31, 2021, 13 pages.

Xu, Yanyan; Fourth Office Action for Chinese Patent Application No. 202010379231.3, filed May 7, 2020, mailed Jun. 8, 2021, 6 pages.

Xu, Yanyan; International Search Report and Written Opinion for PCT Application No. PCT/CN2020/089041, filed May 7, 2020; mailed Jan. 27, 2021; 9 pages.

Examination Report issued on Jan. 10, 2023, in corresponding Indian Application No. 202117022477, 5 pages.

* cited by examiner

ELECTROLYTE AND ELECTROCHEMICAL APPARATUS

CROSS REFERENCE TO RELATED APPLICATIONS

The present application is the National Stage application of PCT international application PCT/CN2020/089041, filed on May 7, 2020, the disclosure of which is hereby incorporated by reference in its entirety.

TECHNICAL FIELD

This application relates to the technical field of energy storage, and in particular, to an electrolyte and an electrochemical apparatus containing the electrolyte

BACKGROUND

Electrochemical apparatuses (for example, lithium-ion batteries) have been widely applied in the fields such as new energy electromobile and electronic products such as cameras, digital cameras and 3C products due to characteristics of high energy density, high working voltage, long life, and environmental protection. A lithium-ion battery generally includes a positive electrode, a negative electrode, a separator, and an electrolyte. As an important component, the electrolyte plays a role of transferring lithium ions between the positive electrode and the negative electrode, and is an important guarantee for the battery to obtain performance such as high energy, high rate, long cycle, and high safety.

The performance of lithium-ion batteries tends to deteriorate at high temperatures, causing problems such as gas evolution during storage and cycling at the high temperatures. Meanwhile, the lithium ion-batteries also have issues such as large film-forming resistance and poor storage performance. Therefore, how to develop lithium-ion batteries with excellent performance has become an urgent issue in the industry.

SUMMARY

To address the foregoing issues, the present application provides an electrolyte and an electrochemical apparatus, which have excellent high-temperature cycle performance and over-discharge storage performance.

One aspect of the present application provides an electrochemical apparatus, including a positive electrode, a negative electrode, an electrolyte, and a separator, where the positive electrode includes a positive electrode current collector and a positive active material layer disposed on the positive current collector, an X-ray photoelectron spectroscopy of the positive active material layer has a peak at 164 eV to 175 eV, and the electrolyte of the electrochemical apparatus has a retention capability of 1.0 g/Ah to 4.0 g/Ah.

In some embodiments, the positive active material layer includes first particles, a cross section perpendicular to the positive electrode current collector in the positive electrode is measured by using a scanning electron microscope, a gray scale of the first particles is not less than 115 RGB, a cross-sectional area of the first particles is less than 20 square micrometers, and a proportion of a total area of the first particles is 5% to 50% based on an area of the cross section perpendicular to the positive electrode current collector in the positive electrode.

In some embodiments, the positive active material layer includes second particles, a cross section perpendicular to the positive electrode current collector in the positive electrode is measured by using a scanning electron microscope, a gray scale of the first particles is less than 115RGB, a cross-sectional area of the second particles is greater than or equal to 20 square micrometers, and a proportion of a total area of the second particles is 10% to 60% based on an area of the cross section perpendicular to the positive electrode current collector in the positive electrode.

In some embodiments, the first particles include $Li_aNi_xCo_yMn_zM_mO_2$, where $0.9 \le a < 1.1$, $0.3 \le x < 1$, $0 < y < 0.7$, $0 < z \le 0.4$, $x+y+z \le 1$, $0 \le m \le 0.1$, the element M includes at least one of Al, Ti, Mg, W, Zr, Nb, In, Ru, Sb, Sr, Y, or F; and the content of the element M is 0 to 1% based on a total weight of the positive active material.

In some embodiments, the second particles include $Li_bMn_{2-n}Me_nO_4$, where the element Me includes at least one of Mg, Ti, Cr, Al, B, Fe, Zr, Na, F, or S, $0.9 \le b < 1.1$, $0 \le n \le 0.1$, and the content of the element Me is 0% to 1% based on a total weight of the positive active material.

In some embodiments, the electrolyte includes an additive A, and the additive A includes at least one of a compound of formula I, a compound of formula II, a compound of formula III, or a compound of formula IV:

formula I formula II formula III formula IV where $R_1$ is selected from H, $C_{1-6}$ alkyl, or $C_{2-6}$ alkenyl;

$R_2$, $R_3$, $R_4$, $R_5$, $R_6$, and $R_7$ are each independently selected from H, halogen, $C_{1-6}$ alkyl unsubstituted or substituted with one or more halogen, or $C_{2-6}$ alkenyl unsubstituted or substituted with one or more halogen;

m is an integer from 1 to 3; and the content of the additive A is 0.01% to 5% based on a total weight of the electrolyte.

In some embodiments, the additive A includes at least one of the following compounds:

methylene methanedisulfonate, propenyl-1,3-sultone, 1,3-propane disulfonic anhydride, In some embodiments, the electrolyte includes at least one of a compound of formula I, a compound of formula II or a compound of formula III, and a compound of formula IV.

In some embodiments, the electrolyte includes an additive B, and the additive B includes at least one of lithium difluorophosphate, lithium 4,5-dicyano-2-trifluoromethyl-imidazole, or difluorobis(oxalato) lithium phosphate; the content of the additive B is 0.01% to 3% based on a total weight of the electrolyte.

In some embodiments, the electrolyte includes an additive C, and the additive C includes at least one of the following phosphate compounds:

and

The content of the additive C is 0.01% to 5% based on a total weight of the electrolyte.

In some embodiments, the electrolyte includes an additive D, and the additive D includes at least one of the following compounds: vinylene carbonate, vinyl ethylene carbonate, 1,4-butane sultone, ethylene sulfate, butanedinitrile, glutaronitrile, adiponitrile, 2-methylene glutaronitrile, dipropylmalononitrile, 1,3,6-hexanetricarbonitrile, 1,2,6-hexanetricarbonitrile, 1,3,5-pentahexanetricarbonitrile, or 1,2-bis(cyanoethoxy)ethane; and the amount of the additive D is 0.01% to 10%, based on a total weight of the electrolyte.

In some embodiments, the electrolyte includes an additive A, and at least one selected from the group consisting of an additive B, an additive C, and an additive D, where the additive A, the additive B, the additive C, and the additive D are as defined in this application.

In another aspect, the present invention provides an electronic apparatus, and the electronic apparatus includes any one of the foregoing electrochemical apparatus.

Additional aspects and advantages of the embodiments of this application are partially described and presented in the later description, or explained by implementation of the embodiments of this application.

DESCRIPTION OF EMBODIMENTS

Embodiments of this application will be described in detail below. The embodiments of this application shall not be construed as a limitation on the protection scope claimed by this application. Unless otherwise specified, the following terms used herein have the meanings indicated below.

The term "approximately" used herein are intended to describe and represent small variations. When used in combination with an event or a circumstance, the term may refer to an example in which the exact event or circumstance occurs or an example in which an extremely similar event or circumstance occurs. For example, when used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. In addition, quantities, ratios, and other values are sometimes presented in the format of ranges in this specification. It should be understood that such range formats are used for convenience and simplicity and should be flexibly understood as including not only values clearly designated as falling within the range but also all individual values or sub-ranges covered by the range as if each value and sub-range were clearly designated.

In the description of embodiments and claims, a list of items preceded by the term "one of" may mean any one of the listed items. For example, if items A and B are listed, the phrase "one of A and B" means only A or only B. In another example, if items A, B, and C are listed, the phrase "one of A, B, and C" means only A, only B, or only C. The item A may contain a single element or a plurality of elements. The item B may contain a single element or a plurality of elements. The item C may contain a single element or a plurality of elements.

In the descriptions of the embodiments and the claims, a list of items preceded by the terms such as "at least one of", "at least one type of" or other similar terms may mean any combination of the listed items. For example, if items A and B are listed, the phrase "at least one of A and B" or "at least one of A or B" means only A, only B, or A and B. In another example, if items A, B, and C are listed, the phrase "at least one of A, B, and C" or "at least one of A, B, or C" means only A, only B, only C, A and B (excluding C), A and C (excluding B), B and C (excluding A), or all of A, B, and C. The item A may contain a single element or a plurality of elements. The item B may contain a single element or a plurality of elements. The item C may contain a single element or a plurality of elements.

In the descriptions of the embodiments and the claims, the carbon number, namely, the number after the capital letter "C", for example, "1", "3" or "10" in "$C_1$ to $C_{10}$" and "$C_3$ to $C_{10}$", represents the number of carbon atoms in a specific functional group. That is, the functional groups may include 1 to 10 carbon atoms and 3 to 10 carbon atoms, respectively. For example, "$C_1$-$C_4$ alkyl group" or "$C_{1-4}$ alkyl group" refers to an alkyl group having 1 to 4 carbon atoms, for example, $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, or $(CH_3)_3C$—.

As used herein, the term "alkyl group" is intended to be a straight chain saturation alkane structure having 1 to 6 carbon atoms. The term "alkyl group" is also intended to be a branched or cyclic hydrocarbon structure having 3 to 6 carbon atoms. For example, the alkyl group may be an alkyl group having 1 to 4 carbon atoms. References to an alkyl group with a specific carbon number are intended to cover all geometric isomers with the specific carbon number. Therefore, for example, "butyl group" means to include n-butyl, sec-butyl, isobutyl, tert-butyl, and cyclobutyl; and "propyl" includes n-propyl, isopropyl, and cyclopropyl. Examples of alkyl groups include, but are not limited to, methyl, ethyl, n-propyl, isopropyl, cyclopropyl, n-butyl, isobutyl, sec-butyl, tert-butyl, cyclobutyl, n-pentyl, isopentyl, neopentyl, cyclopentyl, methylcyclopentyl, ethylcyclopentyl, n-hexyl, isohexyl, cyclohexyl, cyclopropyl, and cyclobutyl. In addition, the alkyl group may be arbitrarily substituted.

The term "alkenyl group" refers to a straight-chain or branched monovalent unsaturated hydrocarbon group having at least one and usually 1, 2, or 3 carbon-carbon double bonds. Unless otherwise defined, the alkenyl group generally contains 2 to 6 carbon atoms, for example, the alkenyl group may be an alkenyl group having 2 to 4 carbon atoms. Representative alkenyl groups include, for example, vinyl, n-propenyl, isopropenyl, n-but-2-enyl, but-3-enyl, and n-hex-3-enyl. In addition, the alkenyl group may be arbitrarily substituted.

When the foregoing substituent groups are substituted, unless otherwise specified, they are substituted with one or more halogens.

As used herein, the term "halogen" covers F, Cl, Br, and I, and preferably, F or Cl.

As used herein, a content of each composition in the electrolyte is calculated based on a total weight of the electrolyte.

I. ELECTROLYTE

Some embodiments of the present invention provide an electrolyte.

In some embodiments, the electrolyte includes an additive A, and the additive A includes at least one of a compound of formula I, a compound of formula II, a compound of formula III, or a compound of formula IV:

where $R_1$ is selected from H, $C_{1-6}$ alkyl, or $C_{2-6}$ alkenyl;
$R_2$, $R_3$, $R_4$, $R_5$, $R_6$ and $R_7$ are each independently selected from H, halogen, $C_{1-6}$ alkyl unsubstituted or substituted with one or more halogen, or $C_{2-6}$ alkenyl unsubstituted or substituted with one or more halogen;
m is an integer from 1 to 3; and
the content of the additive A is 0.01% to 5% based on a total weight of the electrolyte.

In some embodiments, $R_1$ is selected from H, $C_{1-4}$ alkyl or $C_{2-4}$ alkenyl;

In some embodiments, $R_1$ is selected from H, methyl, or ethyl.

In some embodiments, m is 1 or 2.

In some embodiments, $R_2$, $R_3$, $R_4$, $R_5$, $R_6$, and $R_7$ are each independently selected from H, F, $C_{1-4}$ alkyl unsubstituted or substituted with one or more F, or $C_{2-4}$ alkenyl unsubstituted or substituted with one or more F;

In some embodiments, $R_2$, $R_3$, $R_4$, $R_5$, $R_6$, and $R_7$ are each independently selected from H, F, methyl, ethyl, propyl, isopropyl, vinyl, —$CH_2F$, —$CHF_2$, or —$CF_3$.

In some embodiments, the content of the additive A is 0.2% to 4% or 0.5% to 3% based on a total weight of the electrolyte. In some embodiments, based on a total weight of the electrolyte, the content of the additive A is approximately 0.01%, approximately 0.05%, approximately 0.1%, approximately 0.2%, approximately 0.3%, approximately 0.4%, approximately 0.5%, approximately 0.6%, approximately 0.7%, approximately 0.8%, approximately 0.9%, approximately 1%, approximately 1.2%, approximately 1.4%, approximately 1.6%, approximately 1.8%, approximately 2.0%, approximately 2.2%, approximately 2.4%, approximately 2.6%, approximately 2.8%, approximately 3%, approximately 3.2%, approximately 3.4%, approximately 3.6%, approximately 3.8%, approximately 4%, approximately 4.2%, approximately 4.4%, approximately 4.6%, approximately 4.8%, or approximately 5%.

In some embodiments, the additive A includes at least one of the following compounds:

methylene methanedisulfonate, propenyl-1,3-sultone, 1,3-propane disulfonic anhydride, In some embodiments, the additive A includes at least one of methylene methanedisulfonate, propenyl-1,3-sultone, or 1,3-propane disulfonic anhydride, In some embodiments, the compound of formula IV includes:

In some embodiments, the electrolyte includes at least one of a compound of formula I, a compound of formula II or a compound of formula III, and a compound of formula IV.

In some embodiments, the electrolyte includes an additive B, and the additive B includes at least one of lithium difluorophosphate, lithium 4,5-dicyano-2-trifluoromethyl-imidazole, or difluorobis(oxalato) lithium phosphate; the content of the additive B is 0.01% to 3% based on a total weight of the electrolyte.

In some embodiments, the content of the additive B is 0.3% to 3% or 0.5% to 3% based on a total weight of the electrolyte. In some embodiments, based on a total weight of the electrolyte, the content of the additive B is approximately 0.01%, approximately 0.05%, approximately 0.1%, approximately 0.2%, approximately 0.3%, approximately 0.4%, approximately 0.5%, approximately 0.6%, approximately 0.7%, approximately 0.8%, approximately 0.9%, approximately 1%, approximately 1.2%, approximately 1.4%, approximately 1.6%, approximately 1.8%, approximately 2.0%, approximately 2.2%, approximately 2.4%, approximately 2.6%, approximately 2.8%, or approximately 3%.

In some embodiments, the electrolyte includes an additive C, and the additive C includes at least one of the following phosphate compounds:

and the content of the additive C is 0.01% to 5% based on a total weight of the electrolyte.

In some embodiments, the content of the additive C is 0.2% to 4% or 0.5% to 3% based on a total weight of the electrolyte. In some embodiments, based on a total weight of the electrolyte, the content of the additive C is approximately 0.01%, approximately 0.05%, approximately 0.1%, approximately 0.2%, approximately 0.3%, approximately 0.4%, approximately 0.5%, approximately 0.6%, approximately 0.7%, approximately 0.8%, approximately 0.9%, approximately 1%, approximately 1.2%, approximately 1.4%, approximately 1.6%, approximately 1.8%, approximately 2.0%, approximately 2.2%, approximately 2.4%, approximately 2.6%, approximately 2.8%, approximately 3%, approximately 3.2%%, approximately 3.4%, approximately 3.6%, approximately 3.8%, approximately 4%, approximately 4.2%, approximately 4.4%, approximately 4.6%, approximately 4.8%, or approximately 5%.

In some embodiments, the electrolyte includes an additive D, and the additive D includes at least one of the following compounds: vinylene carbonate (VC), vinyl ethylene carbonate, 1,4-butane sultone, ethylene sulfate, butanedinitrile, glutaronitrile, adiponitrile, 2-methylene glutaronitrile, dipropylmalononitrile, 1,3,6-hexanetricarbonitrile, 1,2,6-hexanetricarbonitrile, 1,3,5-pentahexanetricarbonitrile, or 1,2-bis(cyanoethoxy)ethane; and the amount of the additive D is 0.01% to 10% based on a total weight of the electrolyte.

In some embodiments, the additive D includes at least one of the following compounds: vinylene carbonate (VC), 1,3-propane sultone, ethylene sulfate, and 1,3,6-hexanetricarbonitrile.

In some embodiments, the content of the additive D is 0.5% to 8% or 1% to 5% based on a total weight of the electrolyte. In some embodiments, based on a total weight of the electrolyte, the content of the additive D is approximately 0.01%, approximately 0.05%, approximately 0.1%, approximately 0.5%, approximately 1%, approximately 1.5%, approximately 2.0%, approximately 2.5%, approximately 3%, approximately 3.5%, approximately 4%, approximately 4.5%, approximately 5%, approximately 5.5%, approximately 6%, approximately 6.5%, approximately 7%, approximately 7.5%, approximately 8%, approximately 8.5%, approximately 9%, approximately 9.5%, or approximately 10%.

In some embodiments, the electrolyte includes an additive A, and at least one selected from the group consisting an additive B, an additive C, and an additive D; where the additive A, the additive B, the additive C, and the additive D are as defined in this application.

In some embodiments, the electrolyte includes two or more of an additive A, an additive B, an additive C, and an additive D. In some embodiments, the electrolyte includes an additive A and an additive B. In some embodiments, the electrolyte includes an additive A, an additive B, and an additive C. In some embodiments, the electrolyte includes an additive A, an additive B, an additive C, and an additive D.

In some embodiments, the electrolyte further includes a salt and an organic solvent.

In some embodiments, the salt includes at least one of a lithium salt, a sodium salt, or a potassium salt.

In some embodiments, the lithium salt is optionally selected from at least one of an organic lithium salt or an inorganic lithium salt. In some embodiments, the lithium salt includes at least one of fluorine, boron, and phosphorus. In some embodiments, and the lithium salt includes at least one of lithium hexafluorophosphate $LiPF_6$, lithium bistrifluoromethanesulfonimide $LiN(CF_3SO_2)_2$ (LiTFSI for short), lithium bis(fluorosulfonyl)imide $Li(N(SO_2F)_2)$ (LiFSI for short), lithium bisoxalate borate $LiB(C_2O_4)_2$ (LiBOB for short), lithium difluorooxalate borate $LiBF_2(C_2O_4)$ (LiDFOB for short), lithium hexafluoroarsenate $LiAsF_6$, lithium perchlorate $LiClO_4$, or lithium trifluoromethanesulfonate $LiCF_3SO_3$.

In some embodiments, the lithium salt has a concentration of 0.5 mol/L to 1.5 mol/L or 0.8 mol/L to 1.2 mol/L.

In some embodiments, the sodium salt includes at least one of sodium hexafluorophosphate $NaPF_6$, sodium bistrifluoromethanesulfonimide $NaN(CF_3SO_2)_2$ (NaTFSI for short), sodium bis(fluorosulfonyl)imide $Na(N(SO_2F)_2)$ (NaFSI for short), sodium bisoxalate borate $NaB(C_2O_4)_2$ (NaBOB for short), sodium difluorooxalate borate $NaBF_2(C_2O_4)$ (NaDFOB for short), sodium hexafluoroarsenate $NaAsF_6$, sodium perchlorate $NaClO_4$, or sodium trifluoromethanesulfonate $NaCF_3SO_3$.

In some embodiments, the potassium salt includes at least one of potassium hexafluorophosphate $KPF_6$, potassium bistrifluoromethanesulfonimide $KN(CF_3SO_2)_2$ (KTFSI for short), potassium bis(fluorosulfonyl)imide $K(N(SO_2F)_2)$ (KFSI for short), potassium bisoxalate borate $KB(C_2O_4)_2$ (KBOB for short), potassium difluorooxalate borate $KBF_2(C_2O_4)$ (KDFOB for short), potassium hexafluoroarsenate $KAsF_6$, potassium perchlorate $KClO_4$, or potassium trifluoromethanesulfonate $KCF_3SO_3$.

In some embodiments, the organic solvent includes a cyclic ester and a chain ester in a mass ratio of 1:9 to 7:3, where the cyclic ester includes at least one of ethylene carbonate (EC), propylene carbonate (PC), γ-butyrolactone (BL), fluorine-containing group substituted ethylene carbonate, or propylene carbonate; and the chain ester includes at least one of dimethyl carbonate (DMC), diethyl carbonate (DEC), ethyl methyl carbonate (EMC), ethyl acetate (EA), methyl formate (MF), ethyl formate (MA), ethyl propionate (EP), propyl propionate (PP), methyl butyrate (MB), ethyl fluoromethyl carbonate, or ethyl fluoropropionate.

In some embodiments, the organic solvent accounts for 70 wt % to 95 wt % of the weight of the electrolyte.

II. ELECTROCHEMICAL APPARATUS

The electrochemical apparatus according to this application includes any apparatus in which an electrochemical reaction takes place. Specific examples of the apparatus include all kinds of primary batteries, secondary batteries, fuel batteries, solar batteries, or capacitors. Especially, the electrochemical apparatus is a lithium secondary battery, including a lithium metal secondary battery, a lithium-ion secondary battery, a lithium polymer secondary battery, or a lithium-ion polymer secondary battery. In some embodiments, the electrochemical apparatus of this application is an electrochemical apparatus provided with a positive electrode having a positive active material capable of occluding and releasing metal ions, and a negative electrode having a negative active material capable of occluding and releasing metal ions; the electrochemical apparatus includes a positive electrode, a negative electrode, a separator, and any one of the foregoing electrolyte in this application.

Positive Electrode

A positive electrode of the electrochemical apparatus according to the embodiments of this application includes a positive electrode current collector and a positive active material layer disposed on the current collector.

The positive active material layer includes the positive active material, and the positive active material includes a compound that reversibly intercalates and deintercalates a lithium ion (namely, a lithiated intercalation compound). For example, the positive active material may include one or more of lithium cobalt oxide, lithium nickel cobalt manganate, lithium nickel cobalt aluminate, and lithium manganate.

In some embodiments, the positive electrode includes a positive electrode current collector and a positive active material layer, and the positive active material layer may include a mixture of lithium nickel cobalt manganate (NCM) and lithium manganate (LMO).

In some embodiments, the positive electrode includes a positive electrode current collector and a positive active material layer disposed on the positive current collector, the X-ray photoelectron spectroscopy of the positive active material layer has a peak at 164 eV to 175 eV, and the electrolyte of the electrochemical apparatus has a retention capability of 1.0 g/Ah to 4.0 g/Ah.

In some embodiments, the electrolyte of the electrochemical apparatus has a retention capability of 1.5 g/Ah to 4 g/Ah. In some embodiments, the electrolyte of the electrochemical apparatus has a retention capability of approximately 1.0 g/Ah, approximately 1.5 g/Ah, approximately 2.0 g/Ah, approximately 2.3 g/Ah, approximately 2.5 g/Ah, approximately 3.0 g/Ah, approximately 3.5 g/Ah, or approximately 4.0 g/Ah.

In some embodiments, the positive active material layer includes first particles, a cross section perpendicular to the positive electrode current collector in the positive electrode is measured by using a scanning electron microscope, a gray scale of the first particles is not less than 115 RGB, a cross-sectional area of the first particles is less than 20 square micrometers, and a total area of the first particles accounts for 5% to 50% of an area of the cross section perpendicular to the positive electrode current collector in the positive electrode.

In some embodiments, the positive active material layer includes second particles, a cross section perpendicular to the positive electrode current collector in the positive electrode is measured by using a scanning electron microscope, a gray scale of the first particles is less than 115 RGB, a cross-sectional area of the second particles is greater than or equal to 20 square micrometers, and a total area of the second particles accounts for 10% to 60% of an area of the cross section perpendicular to the positive electrode current collector in the positive electrode.

In some embodiments, the positive active material layer has a porosity of 15% to 23%.

In some embodiments, the positive electrode current collector accounts for 5% to 25% of an area of the cross section perpendicular to the positive electrode current collector in the positive electrode.

In some embodiments, the first particles include $Li_aNi_xCo_yMn_zM_mO_2$, where $0.9 \leq a < 1.1$, $0.3 \leq x < 1$, $0 < y < 0.7$, $0 < z \leq 0.4$, $x+y+z \leq 1$, $0 \leq m \leq 0.1$, the element M includes at least one of Al, Ti, Mg, W, Zr, Nb, In, Ru, Sb, Sr, Y, or F, and the element M has a content of 0 to 1% based on a total weight of the positive active material.

In some embodiments, the first particles include at least one of $LiNi_{0.5}Co_{0.3}Mn_{0.2}O_2$, $LiNi_{0.5}Co_{0.3}Mn_{0.198}Zr_{0.002}O_2$, $LiNi_{0.5}Co_{0.3}Mn_{0.198}Mg_{0.002}O_2$, $LiNi_{0.5}Co_{0.3}Mn_{0.198}Zr_{0.001}Ti_{0.001}O_2$, $LiNi_{0.6}Co_{0.2}Mn_{0.198}Mg_{0.001}Al_{0.001}O_2$, or $LiNi_{0.8}Co_{0.1}Mn_{0.098}Zr_{0.001}Ti_{0.001}O_2$.

In some embodiments, the second particles include $LiBMn_{2-n}Me_nO_4$, where the element Me includes at least one of Mg, Ti, Cr, Al, B, Fe, Zr, Na, F, or S, $0.9 \leq b < 1.1$, $0 \leq n \leq 0.1$, and the content of the element Me is 0% to 1% based on a total weight of the positive active material.

In some embodiments, the second particles include at least one of $LiMn_2O_4$, $LiMn_{1.998}Mg_{0.002}O_4$, or $LiMn_{1.98}Mg_{0.02}O_4$.

The positive active material layer further includes a binder, and optionally, further includes a conductive material. The binder enhances binding between particles of the positive active material, and binding between the positive active material and the current collector. Non-limiting examples of the binder include: polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyvinylidene 1,1-difluoroethylene, polyethylene, polypropylene, styrene-butadiene rubber, acrylic (ester) styrene-butadiene rubber, epoxy resin, and nylon.

The positive active material layer includes a conductive material, thereby imparting conductivity to the electrode. The conductive material may include any conductive material that causes no chemical change. Non-limiting examples of the conductive material include: a carbon-based material (for example, natural graphite, artificial graphite, carbon black, acetylene black, Ketjen black, and carbon fiber), a metal-based material (for example, metal powder, and metal fiber, including copper, nickel, aluminum, and silver), a conductive polymer (for example, a polyphenylene derivative), and a mixture thereof.

The positive electrode current collector may be, but is not limited to, aluminum (Al).

Negative Electrode

A negative electrode of the electrochemical apparatus according to the embodiments of this application includes a negative electrode current collector and a negative active material layer synthesized on the current collector, the negative active material layer includes a negative active material, and the negative active material may include a material that reversibly intercalates or deintercalates a lithium ion, lithium metal, a lithium metal alloy, a material capable of doping or dedoping lithium, or a transition metal oxide. The material that reversibly intercalates and deintercalates a lithium ion may be a carbon material. The carbon material may be any carbon-based negative active material commonly used in a lithium-ion rechargeable electrochemical apparatus. Examples of the carbon material include crystalline carbon, amorphous carbon, and combinations thereof. The crystalline carbon may be amorphous or plate-shaped, flake-shaped, spherical or fiber-shaped natural graphite or artificial graphite. The amorphous carbon may be soft carbon, hard carbon, a mesophase pitch carbonization product, or burnt coke. Both low crystalline carbon and high crystalline carbon can be used as the carbon material. The low crystalline carbon material may generally include soft carbon and hard carbon. The high crystalline carbon material may generally include natural graphite, crystalline graphite, pyrolytic carbon, a mesophase pitch-based carbon fiber, meso-carbon microbeads, mesophase pitch, and high-temperature calcined carbon (such as petroleum or coke derived from coal tar pitch).

In the electrochemical apparatus of the present invention, specific types of all the negative active materials are not specifically limited, and may be selected according to actual needs. Specifically, the negative active material is selected from one or more of natural graphite, artificial graphite, meso-carbon microbeads (MCMB for short), hard carbon, soft carbon, silicon, a silicon-carbon composite, a Li—Sn alloy, a Li—Sn—O alloy, Sn, SnO, $SnO_2$, spinel-structure lithiated $TiO_2$—$Li_4T_{15}O_{12}$, and a Li—Al alloy.

The negative active material layer includes a binder, and the binder may include, but is not limited to, various binder polymers, for example, polyvinylidene difluoride-hexafluoropropylene copolymer (PVDF-co-HFP), polyvinylidene difluoride, polyacrylonitrile, polymethylmethacrylate, polyvinyl alcohol, carboxymethyl cellulose, hydroxypropyl cellulose, polyvinyl chloride, carboxylated polyvinyl chloride, polyvinyl fluoride, a polymer containing ethylene oxide, polyvinylpyrrolidone, polyurethane, polytetrafluoroethylene, polyethylene, polypropylene, styrene-butadiene rubber, acrylic (ester)styrene-butadiene rubber, epoxy resin, and nylon.

The negative active material layer further includes a conductive material to improve electrode conductivity. Any conductive material that causes no chemical change can be used as the conductive material. Examples of the conductive material include: a carbon-based material such as natural graphite, artificial graphite, carbon black, acetylene black, Ketjen black, and carbon fiber; a metal-based material such as metal powder or metal fiber including copper, nickel, aluminum, or silver; and a conductive polymer such as a polyphenylene derivative; or any mixture thereof. The negative electrode current collector may be copper foil, nickel foil, stainless steel foil, titanium foil, nickel foam, foamy copper, a polymer substrate coated with a conductive metal, or a combination thereof.

In some embodiments, the negative electrode current collector includes, but is not limited to: copper foil, nickel foil, stainless steel foil, titanium foil, nickel foam, foamy copper, a polymer substrate coated with a conductive metal, and any combination thereof.

The negative electrode may be prepared by using a preparation method known in the art. For example, the negative electrode may be obtained by using the following method: mixing an active material, a conductive material, and a binder in a solvent to prepare an active material composition, and coating the active material composition on a current collector.

Separator

In some embodiments, the electrochemical apparatus according to this application has a separator disposed between the positive electrode and the negative electrode to prevent short-circuit. The separator used in the electrochemical apparatus according to this application is not particularly limited to any material or shape, and may be based on any technology disclosed in the prior art. In some embodiments, the separator includes a polymer or an inorganic substance synthesized by a material stable to the electrolyte of this application.

For example, the separator may include a substrate layer and a surface finishing layer. The substrate layer is a non-woven fabric, membrane, or composite membrane having a porous structure, and a material of the substrate layer is selected from at least one of polyethylene, polypropylene, polyethylene terephthalate, and polyimide. Specifically, a polypropylene porous membrane, a polyethylene porous membrane, polypropylene nonwoven fabric, polyethylene nonwoven fabric, or polypropylene-polyethylene-polypropylene porous composite membrane may be selected.

The surface finishing layer is provided on at least one surface of the substrate layer, and the surface finishing layer may be a polymer layer or an inorganic layer, or may be a layer synthesized by a mixed polymer and an inorganic substance.

The inorganic layer includes inorganic particles and a binder. The inorganic particles are selected from one or a combination of aluminum oxide, silicon oxide, magnesium oxide, titanium oxide, hafnium oxide, tin oxide, ceria oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is selected from one or a combination of polyvinylidene fluoride, a vinylidene fluoride-hexafluoropropylene copolymer, polyamide, polyacrylonitrile, polyacrylate, polyacrylic acid, polyacrylate, polyvinylpyrrolidone, polyvinyl ether, polymethyl methacrylate, polytetrafluoroethylene, and polyhexafluoropropylene.

The polymer layer includes a polymer, and a material of the polymer is selected from at least one of polyamide, polyacrylonitrile, an acrylate polymer, polyacrylic acid, polyacrylate, polyvinylpyrrolidone, polyvinyl ether, polyvinylidene fluoride, and poly(vinylidene fluoride-hexafluoropropylene).

In some embodiments, the separator of the electrochemical apparatus according to this application includes a polyolefin-based microporous membrane and a coating, where the coating includes an organic coating and an inorganic coating, the organic coating is selected from at least one of polyvinylidene fluoride, vinylidene fluoride-hexafluoropropylene copolymer, polyacrylonitrile, polyimide, acrylonitrile-butadiene copolymer, acrylonitrile-styrene-butadiene copolymer, polymethyl methacrylate, poly(methyl acrylate), poly(ethyl acrylate), acrylic acid-styrene copolymer, polydimethylsiloxane, sodium polyacrylate, and sodium carboxymethylcellulose; the inorganic coating is selected from one or more of $SiO_2$, $Al_2O_3$, CaO, $TiO_2$, $ZnO_2$, MgO, $ZrO_2$ and $SnO_2$; and the polymeric binder is selected from polyvinylidene fluoride.

The separator of an electrochemical apparatus according to an embodiment of this application, the separator is selected from a single-layer or multi-layer polyolefin-based microporous membrane consisting of one or more of polyethylene (PE), ethylene-propylene copolymer, polypropylene (PP), ethylene-butylene copolymer, ethylene-hexene copolymer, and ethylene-methyl methacrylate copolymer.

III. APPLICATION

The electrolyte according to the embodiments of this application can improve high-temperature cycle performance, high-temperature storage performance and kinetics of an electrochemical apparatus, and has higher safety, so that the electrochemical apparatus manufactured according to this application is applicable to electronic apparatus in various fields.

The electrochemical apparatus according to this application is not particularly limited to any purpose, and may be used for any known purposes. For example, the electrochemical apparatus may be used for a notebook computer, a pen-input computer, a mobile computer, an electronic book player, a portable telephone, a portable fax machine, a portable copier, a portable printer, a headset, a video recorder, a liquid crystal television, a portable cleaner, a portable CD player, a mini-disc, a transceiver, an electronic notebook, a calculator, a storage card, a portable recorder, a radio, a standby power source, a motor, an automobile, a motorcycle, a motor bicycle, a bicycle, a lighting appliance, a toy, a game console, a clock, an electric tool, a flash lamp, a camera, a large household battery, or a lithium ion capacitor.

IV. EXAMPLES

Hereinafter, Examples and Comparative Examples are given to further specifically illustrate this application, but this application is not limited to these examples without departing from the spirit thereof 1. Preparation of a Lithium-Ion Battery (1) Preparation of a Negative Electrode Artificial graphite, sodium carboxymethylcellulose (CMC) and styrene-butadiene rubber (SBR) were mixed in an appropriate amount of deionized water solvent at a weight ratio of 97:1:2, and a negative electrode slurry was obtained under the action of a vacuum mixer, where the negative electrode slurry had a solid content of 54 wt %; the negative electrode slurry was uniformly coated on a copper foil of a negative-electrode current collector; and the copper foil was dried at 85° C. and then subjected to cold pressing to obtain a negative active material layer, which was cut and slit and dried at 120° C. for 12 hours under a vacuum condition to obtain the negative electrode.

(2) Preparation of a Positive Electrode

Positive Electrodes in Examples 1 to 9 and Comparative Examples 1 to 3

The positive active material lithium nickel cobalt manganate ($LiNi_{0.5}Co_{0.3}Mn_{0.2}O_2$) and lithium manganate ($LiMn_2O_4$) were mixed at a mass ratio of 3:7, and then the mixed positive active material were mixed with conductive agent Super P and and a binder polyvinylidene fluoride (PVDF) at a weight ratio of 96:2:2, followed by adding N-methylpyrrolidone (NMP), the resulting mixture was stirred uniformly under the action of a vacuum mixer to obtain a positive electrode slurry, where the positive electrode slurry had a solid content of 72 wt %. The positive electrode slurry was coated on a copper foil of a positive current collector; and the coated copper foil was dried at 85° C. and then subjected to cold pressing to obtain a positive active material layer, which was cut and slit and dried at 85° C. for 4 hours under a vacuum condition to obtain the positive electrode.

Positive Electrodes in Examples 10 to 13

The preparation method of the positive electrode was similar to that in Example 4, except that an area ratio of lithium nickel cobalt manganate to lithium manganate in the positive active material was different, and the difference in the area ratio was realized by controlling a mass ratio of lithium nickel cobalt manganate to lithium manganate and the grain size of lithium nickel cobalt manganate and lithium manganate particles, provided that the technical scheme could be realized.

Positive Electrodes in Examples 14 to 18

The preparation method of the positive electrode was similar to that in Example 4, except that the positive active material was different.

Positive Electrode in Example 19:

The preparation method of the positive electrode was similar to that in Example 4, except that the positive active materials were not exactly the same and an area ratio of lithium nickel cobalt manganate to lithium manganate in the positive active material was different, and the difference in the area ratio was realized by controlling a mass ratio of lithium nickel cobalt manganate to lithium manganate and the grain size of lithium nickel cobalt manganate and lithium manganate particles, provided that the technical scheme could be realized.

Positive Electrodes in Examples 20 to 55 and Comparative Examples 4 to 5

The preparation method of the positive electrode was exactly the same as that in Example 18.

(3) Preparation of an Electrolyte

In an argon atmosphere glove box, ethylene carbonate (EC), ethyl methyl carbonate (EMC), and diethyl carbonate (DEC) were mixed at a mass ratio of EC:EMC:DEC=30:50:20, then additives were added to dissolve and stir uniformly, and lithium salt $LiPF_6$ was added to mix uniformly to form an electrolyte; where a concentration of $LiPF_6$ was 1.0 mol/L. Specific types and amounts of the additives used in the electrolyte were shown in the following tables, and a content of each substance was a mass percentage calculated based on a total mass of the electrolyte.

(4) Preparation of a Separator

A 16-micron thick polyethylene (PE) separator was used.

(5) Preparation of a Lithium-Ion Battery

The positive electrode, the separator, and the negative electrode were sequentially laminated, so that the separator was interposed between the positive electrode and the negative electrode to provide separation, then the laminated product was wound, followed by welding tabs to obtain an electrode assembly. The electrode assembly was placed in an outer packaging foil aluminum plastic film, and the obtained electrolyte was injected, followed by vacuum packaging, standing, chemical conversion (charged to 3.3 V at a constant current of 0.02 C, then charged to 3.6 V at a constant current of 0.1 C), shaping, and capacity test to obtain a soft package lithium-ion battery.

Preparation of a battery with a specific retention capability of electrolyte: the electrode assembly prepared in the above manner was placed in the outer packaging foil aluminum plastic film, a certain amount of electrolyte was injected into the electrode assembly, followed by vacuum packaging, chemical conversion, exhausting, and extracting a certain amount of electrolyte to obtain a battery with a specific retention capability of electrolyte.

2. Lithium-Ion Battery Performance Test (1) Cycling Test (45° C.)

The lithium-ion battery was placed in a thermostat at 45° C. to stand for 30 minutes to a constant temperature. The lithium-ion battery was charged to a voltage of 4.35 V at a constant current of 1 C, then charged to a current of 0.05 C at a constant voltage of 4.35 V, and then discharged to a voltage of 2.8 V at a constant current of 1 C, which was a charge/discharge cycle process; a discharge capacity at this time was recorded as the capacity of the first discharge; meanwhile, a thickness of the battery was tested and recorded as the initial thickness of the battery. With the first discharge capacity as 100%, the charge/discharge cycle was repeated, a capacity of the battery was measured at cycle 500 and then was calculated, a thickness of the battery was tested, and a thickness swelling rate of the battery was calculated as an index to evaluate cycle performance of the lithium-ion battery.

Capacity retention rate=(Capacity at cycle 500/Capacity at first discharge)×100%

Thickness swelling rate=[(Thickness at cycle 500/Initial thickness of battery]×100%.

(2) Over-Discharge Storage Performance Test:

The lithium-ion battery was placed in a thermostat at 25° C. to stand for 30 minutes to a constant temperature; a thickness of the battery was recorded as the initial thickness of the battery. The lithium-ion battery was discharged to 2.8 V at a constant current of 0.5 C, standing for 30 minutes, then discharged to 2.8 V at a constant current of 0.1 C, and last discharged to 1.0 V at a constant current of 0.01 C. The discharged battery was placed in a thermostat at 60° C. to observe the thickness changes after storage for 30 days. Alternatively, with the thickness change of 10% as a standard, the storage days when the thickness exceeds 10% was calculated.

Over-discharge storage thickness swelling rate (%)=(Thickness after storage 30 days/Initial battery thickness)×100%

(3) Electrolyte Retention Capacity Test

Retention capacity of electrolyte in battery=Mass of electrolyte in battery (g)/Battery capacity (Ah), unit: g/Ah.

Mass of electrolyte in the battery: The battery was discharged to 2.8 V at a constant current of 0.1 C, the battery was weighed as m0, then the battery was disassembled, and the disassembled electrode assembly and outer packaging foil aluminum plastic film was placed in high-purity acetonitrile (purity ≥99.9%) for extraction. The extracted electrode assembly and outer packaging foil aluminum plastic were dried in a vacuum oven, followed by weighing the total mass as m1. The electrolyte mass in the battery (g) was equal to m0-m1.

Method for testing battery capacity: The lithium-ion battery was charged to a voltage of 4.35 V at a constant current of 0.2 C, then the lithium-ion battery was charged to a current of 0.05 C with a constant voltage of 4.35 V, next the lithium-ion battery was discharged to a final voltage of 2.8 V at a constant current of 0.2 C, and a battery capacity was recorded.

(4) X-Ray Photoelectron Spectroscopy (XPS) Test

A PHI 5000 VersaProbe III X-ray photoelectron spectroscopy analyzer was used for testing.

The battery discharged to 2.8 V was disassembled to remove the positive electrode from the battery, the area of the positive electrode current collector with a size of 1.5 cm×1.0 cm that has positive active material layers on both sides was taken as a flat and clean sample and was tested in an analysis room, which was maintained under ultra-high vacuum state, a position of the sample for analysis was selected through a video device and excited by X-ray, photoelectrons were collected, and slow electrons were ejected by an electron neutralization system to neutralize the residual charge in the analysis position to obtain a spectrogram.

(5) Porosity Test for Positive-Electrode Active Material Layer

A porosity P of the positive active material layer was tested by a gas displacement method.

$P=(V-V0)/V \times 100\%$, where $V0$ is true volume and $V$ is apparent volume.

The test method was followed "GB/T 24586-2009 Iron ores-Determination of apparent density, true density and porosity".

(6) Scanning Electron Microscope (SEM) Test for Positive Electrode

JEOL scanning electron microscope JSM-6390LV was used for testing. Test method was that: The battery discharged to 2.8 V was disassembled, the positive electrode was taken out, and dried and cut into a sample of appropriate size, which was put into the sample room with magnification of 1000 to 30 K, and resolution of 3.0 nm to 10 nm; and a cross section of the positive electrode perpendicular to the positive electrode current collector was selected for testing.

Calculation method of area ratios of the first particles and the second particles The second particles and the current collectors were recognized by using a function of recognizing the pattern and morphology of Image J software, and the areas corresponding to the second particles and the positive electrode current collector were correspondingly calculated, with a total area of the cross section of the positive electrode as S, a total area of the second particles as $S_2$, an area of the positive electrode current collector as $S_3$, a porosity as P, and area ratios of the conductive agent and the binder being ignored. The results showed that a gray scale of the second particles was less than 115 RGB, and a cross-sectional area of the second particles was greater than or equal to 20 square micrometers.

Ratio of the total area of the first particles=$(S-S_2-S_3)/S \times 100\% - P$

Ratio of the total area of the second particles=$S_2/S \times 100\%$

3. Names and Abbreviations of Chemical Substances in Experimental Samples

TABLE 1

| Name | Molecular formula or abbreviation | Name | Molecular formula or abbreviation |
|---|---|---|---|
| Lithium difluorophosphate | $LiPO_2F_2$ | methylene methanedisulfonate | MMDS |
| 4,5-dicyano-2-trifluoromethylimidazole | LiTDI | propenyl-1,3-sultone | PES |
| difluorobis(oxalato) lithium phosphate | LiDFOP | 1,3-propane disulfonic anhydride | PA |
| tris (trimethylsilyl) phosphate | TMSP | 1,3-propane sultone | PS |
| triphenyl phosphate | TPPA | vinylene carbonate | VC |
| tris (trimethylsilyl) phosphite | TMSPi | ethylene sulfate | DTD |
| triphenyl phosphite | TPPi | 1,3,6-hexanetricarbonitrile | HTCN |

4. Test Results

A. The electrolyte and lithium-ion batteries in Examples 1 to 9 and Comparative Examples 1 to 3 were prepared according to the above-mentioned method. See Table 2 for electrolyte composition, electrolyte retention capacity, XPS test of the positive-electrode active material layer, and battery performance test results.

TABLE 2

| Sample | Additive A (%) | XPS test for positive active material layer Whether or not there is a peak at 164 eV to 175 eV | Electrolyte retention capacity (g/Ah) | Cycle performance at 45° C. Capacity retention rate (500 cycles) | Cycle performance at 45° C. Thickness swelling rate | Over-discharge storage thickness swelling rate |
|---|---|---|---|---|---|---|
| Example 1 | 1.5% PS + 1% MMDS | Yes | 1 | 71.0% | 10.8% | 12.3% |
| Example 2 | 1.5% PS + 1% MMDS | Yes | 1.5 | 81.0% | 10.0% | 10.1% |
| Example 3 | 1.5% PS + 1% MMDS | Yes | 2 | 84.2% | 9.0% | 9.6% |
| Example 4 | 1.5% PS + 1% MMDS | Yes | 2.3 | 84.8% | 8.3% | 7.4% |
| Example 5 | 1.5% PS + 1% MMDS | Yes | 3 | 84.1% | 10.2% | 11.4% |

TABLE 2-continued

| Sample | Additive A (%) | XPS test for positive active material layer Whether or not there is a peak at 164 eV to 175 eV | Electrolyte retention capacity (g/Ah) | Cycle performance at 45° C. Capacity retention rate (500 cycles) | Thickness swelling rate | Over-discharge storage thickness swelling rate |
|---|---|---|---|---|---|---|
| Example 6 | 1.5% PS + 1% MMDS | Yes | 4 | 82.2% | 13.9% | 13.5% |
| Example 7 | 2% PS + 0.7% MMDS | Yes | 2.3 | 82.7% | 7.1% | 8.2% |
| Example 8 | 2.2% PS | Yes | 2.3 | 80.2% | 9.4% | 10.1% |
| Example 9 | 1% PS + 1.5% MMDS | Yes | 2.3 | 83.4% | 7.0% | 8.7% |
| Comparative Example 1 | 1.5% PS + 1% MMDS | Yes | 4.6 | 66.1% | 18.0% | 17.3% |
| Comparative Example 2 | 1.5% PS + 1% MMDS | Yes | 0.9 | 64.10% | 20.60% | 19.9% |
| Comparative Example 3 | / | No | 2.3 | 67.60% | 25.00% | 16.5% |

Note:
"/" indicates not added.

Figure 1:
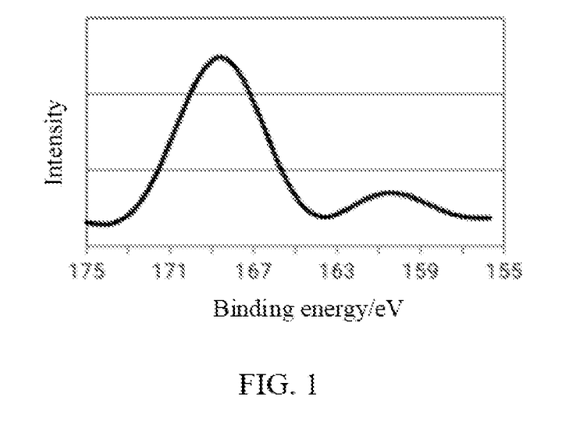
FIG. 1: X-ray photoelectron spectroscopy test results according to an embodiment of this application.

The X-ray photoelectron spectroscopy test results of the positive active material layer of Example 1 were shown in FIG. 1, and the positive active material layer in Example 1 had an XPS spectrum with a peak at 164 eV to 175 eV, whereas the positive active material layer in Comparative Example 3 had an XPS spectrum with no peak at 164 eV to 175 eV (that is, its XPS spectrum showed a baseline at 164 eV to 175 eV).

As shown in Table 2, similar to Example 1, the positive active material layers in Examples 2 to 9 and Comparative Examples 1 to 2 had an XPS spectra with a peak at 164 eV to 175 eV.

The inventors found that XPS spectra having a peak at 164 eV to 175 eV of the positive active material layers in Examples 1 to 9 may be caused by addition of the additive A to the electrolyte.

In addition, it could be seen from comparison of Examples 1 to 9 with Comparative Examples 1 to 2, when the electrolyte retention capacity in the lithium-ion battery was 1.0 g/Ah to 4 g/Ah, the battery had improved high-temperature cycle performance and over-discharge storage performance. The improvement effect was particularly obvious when the electrolyte retention capacity was 1.5 g/Ah to 4 g/Ah.

Without wishing to be bound by any theory, the above improvement may be due to the fact that when the sulfur-containing additive A was added to the electrolyte, a sulfur-containing protective layer might be synthesized, so that the high-temperature cycle performance of the battery was improved due to the excellent stability of the sulfur-containing substance. In addition, controlling the electrolyte retention capacity to be within an appropriate range could not only ensure the amount of electrolyte required during the cycling, but also make the battery have a good interface and consume less additives, so that high-temperature cycle performance and/or over-discharge storage performance deteriorates could be inhibited.

B. The electrolyte and lithium-ion batteries in Example 4 and Examples 10 to 19 were prepared according to the above-mentioned method. The composition of the positive electrode and the results of SEM test and battery performance test were shown in Table 3. In Table 3, composition of the electrolyte of each battery sample was the same as in Example 4, and retention capacity of the electrolyte of each battery sample was 2.3 g/Ah. The area ratios of the first particles and the second particles in Table 3 were controlled by controlling the mass ratios of the first particles and the second particles.

TABLE 3

| Battery Sample | First particles (NCM) | Ratio of a total area of the first particles | Second particles (LMO) | Ratio of a total area of the second particles | Cycle performance at 45° C. Capacity retention rate (500 cycles) | Thickness swelling rate | Over-discharge storage thickness swelling rate |
|---|---|---|---|---|---|---|---|
| Example 4 | $LiNi_{0.5}Co_{0.3}Mn_{0.2}O_2$ | 30% | $LiMn_2O_4$ | 34% | 84.8% | 8.3% | 7.4% |
| Example 10 | $LiNi_{0.5}Co_{0.3}Mn_{0.2}O_2$ | 22% | $LiMn_2O_4$ | 34% | 85.5% | 8.7% | 7.9% |
| Example 11 | $LiNi_{0.5}Co_{0.3}Mn_{0.2}O_2$ | 15% | $LiMn_2O_4$ | 39% | 85.7% | 8.4% | 8.1% |
| Example 12 | $LiNi_{0.5}Co_{0.3}Mn_{0.2}O_2$ | 40% | $LiMn_2O_4$ | 20% | 85.6% | 8.4% | 8.6% |

TABLE 3-continued

| Battery Sample | First particles (NCM) | Ratio of a total area of the first particles | Second particles (LMO) | Ratio of a total area of the second particles | Cycle performance at 45° C. Capacity retention rate (500 cycles) | Thickness swelling rate | Over-discharge storage thickness swelling rate |
|---|---|---|---|---|---|---|---|
| Example 13 | $LiNi_{0.5}Co_{0.3}Mn_{0.2}O_2$ | 8% | $LiMn_2O_4$ | 56% | 82.1% | 9.2% | 10.5% |
| Example 14 | $LiNi_{0.5}Co_{0.3}Mn_{0.198}Zr_{0.002}O_2$ | 30% | $LiMn_2O_4$ | 34% | 86.8% | 8.1% | 7.0% |
| Example 15 | $LiNi_{0.5}Co_{0.3}Mn_{0.198}Mg_{0.002}O_2$ | 30% | $LiMn_{1.998}Mg_{0.002}O_4$ | 34% | 86.4% | 8.0% | 6.9% |
| Example 16 | $LiNi_{0.5}Co_{0.3}Mn_{0.198}Zr_{0.001}Ti_{0.001}O_2$ | 30% | $LiMn_2O_4$ | 34% | 86.6% | 7.9% | 6.8% |
| Example 17 | $LiNi_{0.5}Co_{0.3}Mn_{0.198}Zr_{0.001}Ti_{0.001}O_2$ | 30% | $LiMn_{1.998}Mg_{0.002}O_4$ | 34% | 87.1% | 7.7% | 6.4% |
| Example 18 | $LiNi_{0.6}Co_{0.2}Mn_{0.198}Mg_{0.001}Al_{0.001}O_2$ | 30% | $LiMn_{1.98}Mg_{0.02}O_4$ | 34% | 87.3% | 7.6% | 6.7% |
| Example 19 | $LiNi_{0.8}Co_{0.1}Mn_{0.098}Zr_{0.001}Ti_{0.001}O_2$ | 3% | $LiMn_{1.98}Mg_{0.02}O_4$ | 62% | 81.1% | 10.1% | 10.6% |

Figure 2:
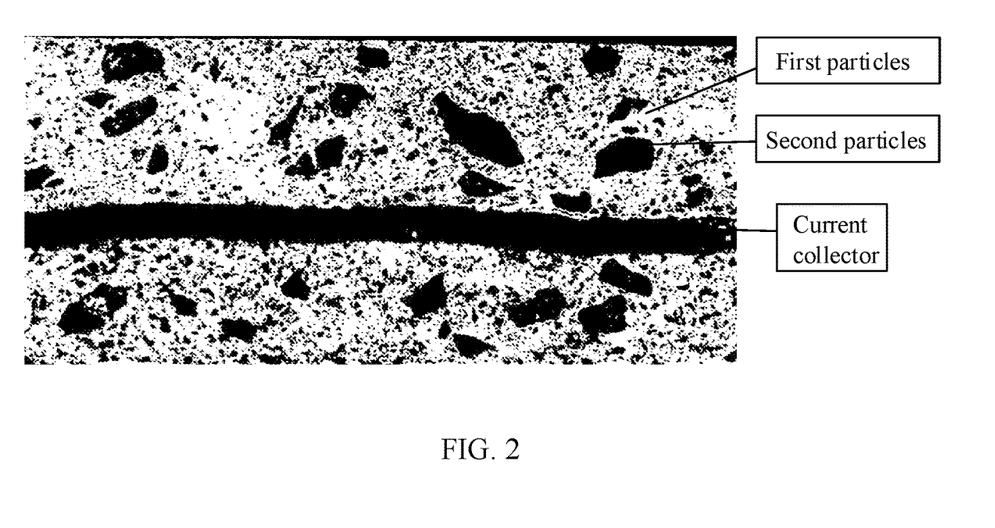
FIG. 2: Scanning electron microscope test results according to an embodiment of this application.

FIG. 2 is an SEM image of the positive electrode in Example 11.

By comparing Example 4 with Examples 10 to 19, it could be seen that under the action of the electrolyte of the present invention, mixing the first particles and the second particles in the positive electrode material in different ratios within a suitable range might obtain better effects.

C. The electrolyte and lithium-ion batteries in Example 18, Examples 20 to 51, and Comparative Examples 4 to 5 were prepared according to the above-mentioned method. See Table 4 for electrolyte composition and batteries test results. In Table 4, the electrolyte retention capacity of each battery sample was 2.3 g/Ah.

TABLE 4

| Battery Sample | Additive A | Additive B | Additive C | Cycle performance at 45° C. Capacity retention rate (500 cycles) | Thickness swelling rate | Over-discharge storage thickness swelling rate |
|---|---|---|---|---|---|---|
| Comparative Example 4 | / | 0.5% $LiPO_2F_2$ | / | 69.3% | 20.5% | 18.3% |
| Comparative Example 5 | / | / | 1% TMSP | 69.1% | 21.9% | 18.1% |
| Example 18 | 1.5% PS + 1% MMDS | / | / | 87.3% | 7.6% | 6.7% |
| Example 20 | 1.5% PS + 1% MMDS | 0.5% $LiPO_2F_2$ | 1% TMSP | 90.1% | 6.8% | 6.1% |
| Example 21 | 1.5% PS + 1% MMDS | 0.3% $LiPO_2F_2$ | / | 87.6% | 7.6% | 6.5% |
| Example 22 | 1.5% PS + 1% MMDS | 0.5% $LiPO_2F_2$ | / | 88.3% | 7.5% | 6.4% |
| Example 23 | 1.5% PS + 1% MMDS | 1% $LiPO_2F_2$ | / | 88.1% | 7.7% | 6.5% |
| Example 24 | 1% MMDS | / | / | 82.3% | 11.4% | 10.3% |
| Example 25 | 1% MMDS | 0.5% $LiPO_2F_2$ | / | 84.2% | 10.7% | 10.1% |
| Example 26 | 1% MMDS | / | 1% TMSP | 84.7% | 10.9% | 9.6% |
| Example 27 | 1% MMDS | 1% LiDFOP | 1% TMSP | 85.2% | 10.4% | 9.3% |
| Example 28 | 1% MMDS | 1% LiTDI | 1% TMSP | 85.1% | 10.4% | 9.4% |
| Example 29 | 1% MMDS | 1% LiTDI + 1% $LiPO_2F_2$ | 1% TMSP | 88.0% | 10.0% | 7.1% |
| Example 30 | 1% MMDS | 1% LiDFOP + 1% $LiPO_2F_2$ | 1%TMSP | 85.9% | 9.8% | 7.0% |
| Example 31 | 1% MMDS | 1% LiDFOP + 1% LiTDI | 1% TMSP | 85.3% | 9.6% | 7.5% |
| Example 32 | 1% MMDS | 1%$LiPO_2F_2$ + 1% LiDFOP + 1% LiTDI | 1% TMSP | 87.6% | 10.0% | 6.4% |
| Example 33 | 0.5% MMDS | 0.5% $LiPO_2F_2$ | 1% TMSP | 83.3% | 11.5% | 10.3% |
| Example 34 | 2% MMDS | 0.5% $LiPO_2F_2$ | 1% TMSP | 85.9% | 8.5% | 8.1% |
| Example 35 | 3% MMDS | 0.5% $LiPO_2F_2$ | 1% TMSP | 84.7% | 9.4% | 8.5% |

TABLE 4-continued

| Battery Sample | Additive A | Additive B | Additive C | Cycle performance at 45° C. Capacity retention rate (500 cycles) | Thickness swelling rate | Over-discharge storage thickness swelling rate |
|---|---|---|---|---|---|---|
| Example 36 | 5% MMDS | 0.5% LiPO$_2$F$_2$ | 1% TMSP | 83.2% | 9.5% | 7.9% |
| Example 37 | 1% PES | 0.5% LiPO$_2$F$_2$ | 1% TMSP | 85.0% | 9.2% | 7.5% |
| Example 38 | 1% PA | 0.5% LiPO$_2$F$_2$ | 1% TMSP | 86.4% | 8.7% | 7.8% |
| Example 39 | 1% MMDS + 1% PES | 0.5% LiPO$_2$F$_2$ | 1% TMSP | 89.8% | 7.3% | 6.0% |
| Example 40 | 1% MMDS + 1% PA | 0.5% LiPO$_2$F$_2$ | 1% TMSP | 90.6% | 7.1% | 7.0% |
| Example 41 | 1% PA + 1% PES | 0.5% LiPO$_2$F$_2$ | 1% TMSP | 90.1% | 7.9% | 6.5% |
| Example 42 | 1% PA + 1% MMDS + 0.3% PES | 0.5% LiPO$_2$F$_2$ | 1% TMSP | 91.9% | 6.5% | 4.0% |
| Example 43 | 1% MMDS | 0.5% LiPO$_2$F$_2$ | 0.2% TMSP | 85.2% | 9.7% | 8.1% |
| Example 44 | 1% MMDS | 0.5% LiPO$_2$F$_2$ | 0.5% TMSP | 86.0% | 9.0% | 7.4% |
| Example 45 | 1% MMDS | 0.5% LiPO$_2$F$_2$ | 2% TMSP | 86.4% | 8.9% | 7.6% |
| Example 46 | 1% MMDS | 0.5% LiPO$_2$F$_2$ | 3% TMSP | 85.6% | 9.1% | 8.0% |
| Example 47 | 2% MMDS | 0.5% LiPO$_2$F$_2$ | 4% TMSP | 85.9% | 9.5% | 7.7% |
| Example 48 | 3% MMDS | 0.5% LiPO$_2$F$_2$ | 5% TMSP | 85.9% | 9.9% | 7.4% |
| Example 49 | 1% MMDS | 0.5% LiPO$_2$F$_2$ | 1% TPPA | 86.2% | 8.9% | 7.6% |
| Example 50 | 1% MMDS | 0.5% LiPO$_2$F$_2$ | 1% TMSPi | 85.9% | 8.7% | 7.9% |
| Example 51 | 1% MMDS | 0.5% LiPO$_2$F$_2$ | 1% TPPi | 86.2% | 8.5% | 8.0% |

Note:
"/" indicates not added.

It could be seen from Table 4, compared with the case in which only one of the additives A, B and C was added, the addition of a specific amount of additives A in combination with the additive B and/or additive C to the electrolyte could significantly improve cycle and over-discharge storage performance.

Without wishing to be bound by any theory, the above improvement might be mainly because the additive A could synthesize a sulfur-containing protective layer on the positive electrode. The sulfur-containing material had excellent stability and therefore improved the high temperature cycle performance of the battery; the additive B could synthesize a solid electrolyte interface film (SEI) with lower impedance to protect a negative electrode interface, thereby improving the high-temperature cycle performance; and the additive C could improve the thermal stability of the electrolyte, relieve positive transition metal ions caused by HF generated by decomposition of LiPF6, and improve the stability of the positive electrode. The additive A and the additive B and/or the additive C acted synergistically to improve cycle and gas evolution within the cycle without increasing impedance, and improve the stability of SEI.

D. The electrolyte and lithium-ion batteries in Example 42 and Examples 52 to 55 were prepared according to the above-mentioned method. See Table 5 for electrolyte composition and test results. In Table 5, the electrolyte retention capacity of each battery sample was 2.3 g/Ah.

TABLE 5

| Sample | Additive A | Additive B | Additive C | Additive D | Capacity retention rate after cycling at 45° C. (500 cycles) | Thickness expansion rate (45° C.) | Over-discharge storage (das) |
|---|---|---|---|---|---|---|---|
| Example 42 | 1% PA + 1% MMDS + 0.3% PES | 0.5% LiPO$_2$F$_2$ | 1% TMSP | / | 91.9% | 6.5% | 21 |
| Example 52 | 1% PA + 1% MMDS + 0.3% PES | 0.5% LiPO$_2$F$_2$ | 1% TMSP | 0.5% VC | 92.0% | 6.1% | 27 |
| Example 53 | 1% PA + 1% MMDS + 0.3% PES | 0.5% LiPO$_2$F$_2$ | 1% TMSP | 1% DTD | 92.3% | 6.4% | 24 |

TABLE 5-continued

| Sample | Additive A | Additive B | Additive C | Additive D | Cycle performance Capacity retention rate after cycling at 45° C. (500 cycles) | Thickness expansion rate (45° C.) | Over-discharge storage (das) |
|---|---|---|---|---|---|---|---|
| Example 54 | 1% PA + 1% MMDS + 0.3% PES | 0.5% LiPO$_2$F$_2$ | 1% TMSP | 1% HTCN | 92.8% | 5.6% | 27 |
| Example 55 | 1% PA + 1% MMDS + 0.3% PES | 0.5% LiPO$_2$F$_2$ | 1% TMSP | 0.5% VC + 1% DTD | 92.2% | 5.7% | 30 |

Note:
"/" indicates not added.

It could be seen from Table 5 that on the basis of adding a specific amount of the additives A, B, and C to the electrolyte, the addition of an appropriate amount of the additive D (at least one of VC, DTD and HTCN) could further improve the cycle and over-discharge performance of the battery.

Without wishing to be bound by any theory, the above improvement might be mainly because that the additive D further formed a film on the negative electrode, stabilized the transition metal ions of the positive electrode, and slowed down the reaction of the electrolyte on the positive electrode. The combined use of the above additives A, B, C, and D improved the stability of the positive electrode of the lithium-ion battery, thereby improving the safety performance of the battery.

In summary, the above examples show that the electrolyte provided in the present invention can improve the cycle performance and over-discharge storage performance of an electrochemical apparatus.

The above are merely a few embodiments of the present invention, and do not limit the present invention in any form. Although the present invention is disclosed as above with preferred embodiments, the embodiments are not intended to limit the present invention. Changes or modifications made by those skilled in the art by using the technical content disclosed above without departing from the scope of the technical solution of the present invention are considered as equivalent embodiments and fall within the scope of the technical solution.

References to "some embodiments", "an embodiment", "another example", "examples", "specific examples", or "some examples" in the specification mean the inclusion of specific features, structures, materials, or characteristics described in the embodiment or example in at least one embodiment or example of the application. Accordingly, descriptions appearing in the specification, such as "in some embodiments", "in the embodiments", "in an embodiment", "in another example", "in an example", "in a particular example", or "for example", are not necessarily references to the same embodiments or examples in the application. In addition, specific features, structures, materials, or characteristics herein may be incorporated in any suitable manner into one or more embodiments or examples. Although illustrative embodiments have been demonstrated and described, those skilled in the art should understand that the above embodiments are not to be construed as limiting the application, and that the embodiments may be changed, replaced, and modified without departing from the spirit, principle, and scope of the application.

What is claimed is:

1. An electrochemical apparatus, comprising: a positive electrode, a negative electrode, an electrolyte and a separator; wherein the positive electrode comprises a positive electrode current collector and a positive active material layer disposed on the positive current collector; an X-ray photoelectron spectroscopy of the positive active material layer has a peak at 164 eV to 175 eV, and the electrolyte has a retention capability of 1.0 g/Ah to 4.0 g/Ah;

wherein the electrolyte comprises an additive A, and the additive A comprises at least one of a compound of formula II, a compound of formula III, or a compound of formula IV:

formula II formula III formula IV wherein R$_1$ is selected from H, C$_{1-6}$ alkyl, or C$_{2-6}$ alkenyl; R$_2$, R$_3$, R$_4$, R$_5$, R$_6$, and R$_7$ are each independently selected from H, a halogen, C$_{1-6}$ alkyl unsubstituted or substituted with one or more halogen, or C$_{2-6}$ alkenyl unsubstituted or substituted with one or more halogen;
m is an integer from 1 to 3; and wherein the positive active material layer comprises first particles and second particles; a cross section perpendicular to the positive electrode current collector in the positive electrode is measured by using a scanning electron microscope, a gray scale of the first particles is not less than 115 RGB, a gray scale of the second particles is less than 115 RGB, and a cross-sectional area of the first particles is less than 20 square micrometers.

2. The electrochemical apparatus according to claim 1, wherein in the cross section perpendicular to the positive electrode current collector in the positive electrode, a total area of the first particles accounts for 5% to 50% of an area of the cross section perpendicular to the positive electrode current collector in the positive electrode.

3. The electrochemical apparatus according to claim 1, wherein in the cross section perpendicular to the positive electrode current collector in the positive electrode, a cross-sectional area of the second particles is greater than or equal to 20 square micrometers, and a total area of the second particles accounts for 10% to 60% of an area of the cross section perpendicular to the positive electrode current collector in the positive electrode.

4. The electrochemical apparatus according to claim 2, wherein the first particles comprise $Li_aNi_xCo_yMn_zM_mO_2$, $0.9 \leq a < 1.1$, $0.3 \leq x < 1$, $0 < y < 0.7$, $0 < z \leq 0.4$, $x+y+z \leq 1$, $0 \leq m \leq 0.1$, the element M comprises at least one of Al, Ti, Mg, W, Zr, Nb, In, Ru, Sb, Sr, Y, or F.

5. The electrochemical apparatus according to claim 4, wherein a content of the element M is 0% to 1% based on a total weight of the positive active material.

6. The electrochemical apparatus according to claim 3, wherein the second particles comprise $Li_bMn_{2-n}Me_nO_4$, the element Me comprises at least one of Mg, Ti, Cr, Al, B, Fe, Zr, Na, F, or S, $0.9 \leq b < 1.1$, $0 \leq n \leq 0.1$.

7. The electrochemical apparatus according to claim 6, wherein a content of the element Me is 0% to 1% based on a total weight of the positive active material.

8. The electrochemical apparatus according to claim 1, wherein a content of the additive A is 0.01% to 5% based on a total weight of the electrolyte.

9. The electrochemical apparatus according to claim 1, wherein the additive A comprises at least one of the following compounds:
methylene methanedisulfonate, propenyl-1,3-sultone, 1,3-propane disulfonic anhydride, 10. The electrochemical apparatus according to claim 1, wherein the electrolyte further comprises an additive B, and the additive B comprises at least one of lithium difluorophosphate, lithium 4,5-dicyano-2-trifluoromethylimidazole, or difluorobis(oxalato) lithium phosphate.

11. The electrochemical apparatus according to claim 10, wherein a content of the additive B is 0.01% to 3% based on a total weight of the electrolyte.

12. The electrochemical apparatus according to claim 1, wherein the electrolyte further comprises an additive C, and the additive C comprises at least one of the following phosphate compounds:

13. The electrochemical apparatus according to claim 12, wherein a content of the additive C is 0.01% to 5% based on a total weight of the electrolyte.

14. The electrochemical apparatus according to claim 1, wherein the electrolyte further comprises an additive D, and the additive D comprises at least one of the following compounds: vinylene carbonate, vinyl ethylene carbonate, 1,4-butane sultone, ethylene sulfate, butanedinitrile, glutaronitrile, adiponitrile, 2-methylene glutaronitrile, dipropylmalononitrile, 1,3,6-hexanetricarbonitrile, 1,2,6-hexanetricarbonitrile, 1,3,5-pentahexanetricarbonitrile, or 1,2-bis(cyanoethoxy)ethane.

15. The electrochemical apparatus according to claim 14, wherein an amount of the additive D is 0.01% to 10% based on a total weight of the electrolyte.

16. The electrochemical apparatus according to claim 1, wherein the electrolyte further comprises:
at least one selected from the group consisting of an additive B, an additive C, and an additive D;
the additive B comprises at least one of lithium difluorophosphate, lithium 4,5-dicyano-2-trifluoromethylimidazole, or difluorobis(oxalato) lithium phosphate;

the additive C comprises at least one of the following phosphate compounds:

and the additive D comprises at least one of the following compounds: vinylene carbonate, vinyl ethylene carbonate, 1,4-butane sultone, ethylene sulfate, butanedinitrile, glutaronitrile, adiponitrile, 2-methylene glutaronitrile, dipropylmalononitrile, 1,3,6-hexanetricarbonitrile, 1,2,6-hexanetricarbonitrile, 1,3,5-pentahexanetricarbonitrile, or 1,2-bis(cyanoethoxy)ethane.

17. An electronic apparatus, comprising an electrochemical apparatus; wherein the electrochemical apparatus comprises a positive electrode, a negative electrode, an electrolyte and a separator; wherein the positive electrode comprises a positive electrode current collector and a positive active material layer disposed on the positive current collector, an X-ray photoelectron spectroscopy of the positive active material layer has a peak at 164 eV to 175 eV, and the electrolyte has a retention capability of 1.0 g/Ah to 4.0 g/Ah;

wherein the electrolyte comprises an additive A, and the additive A comprises at least one of a compound of formula II, a compound of formula III, or a compound of formula IV:

formula II formula III formula IV wherein $R_1$ is selected from H, $C_{1-6}$ alkyl, or $C_{2-6}$ alkenyl;

$R_2$, $R_3$, $R_4$, $R_5$, $R_6$, and $R_7$ are each independently selected from H, a halogen, $C_{1-6}$ alkyl unsubstituted or substituted with one or more halogen, or $C_{2-6}$ alkenyl unsubstituted or substituted with one or more halogen;

m is an integer from 1 to 3; and wherein the positive active material layer comprises first particles and second particles; a cross section perpendicular to the positive electrode current collector in the positive electrode is measured by using a scanning electron microscope, a gray scale of the first particles is not less than 115 RGB, a gray scale of the second particles is less than 115 RGB, and a cross-sectional area of the first particles is less than 20 square micrometers.

18. The electronic apparatus according to claim 17, wherein the additive A comprises at least one of the following compounds:

methylene methanedisulfonate, propenyl-1,3-sultone, 1,3-propane disulfonic anhydride,